(12) United States Patent
Kwon et al.

(10) Patent No.: US 10,949,037 B2
(45) Date of Patent: Mar. 16, 2021

(54) METHOD FOR MANUFACTURING FLEXIBLE DISPLAY DEVICE COMPRISING TOUCH SENSOR

(71) Applicant: DONGWOO FINE-CHEM CO., LTD., Iksan-si (KR)

(72) Inventors: Dohyoung Kwon, Osan-si (KR); Euk Kun Yoon, Hwaseong-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 131 days.

(21) Appl. No.: 16/010,588

(22) Filed: Jun. 18, 2018

(65) Prior Publication Data
US 2018/0364834 A1 Dec. 20, 2018

(30) Foreign Application Priority Data

Jun. 19, 2017 (KR) .................. 10-2017-0077345

(51) Int. Cl.
*G06F 3/045* (2006.01)
*G06F 3/044* (2006.01)
*G02B 5/30* (2006.01)

(52) U.S. Cl.
CPC .......... *G06F 3/0443* (2019.05); *G06F 3/0446* (2019.05); *G02B 5/3033* (2013.01); *G06F 2203/04102* (2013.01); *G06F 2203/04103* (2013.01)

(58) Field of Classification Search
CPC .......... G06F 3/044; G06F 2203/04102; G06F 2203/04103; G02B 5/3033
USPC .......................................................... 345/174
See application file for complete search history.

(56) References Cited

U.S. PATENT DOCUMENTS

| | | | | |
|---|---|---|---|---|
| 2007/0063939 | A1* | 3/2007 | Bellamy | G02F 1/13452 345/87 |
| 2010/0317173 | A1* | 12/2010 | Kanai | C09J 7/20 438/464 |
| 2011/0164301 | A1* | 7/2011 | Paolini, Jr. | C08J 7/16 359/245 |
| 2013/0000829 | A1* | 1/2013 | Carmi | B32B 7/06 156/230 |
| 2015/0217550 | A1* | 8/2015 | Gosnell | B42D 25/29 156/249 |
| 2016/0233383 | A1* | 8/2016 | Matias | H01L 33/02 |
| 2016/0282978 | A1* | 9/2016 | Wang | B32B 37/12 |
| 2016/0351764 | A1* | 12/2016 | Cha | H01L 33/58 |
| 2018/0307346 | A1* | 10/2018 | Lee | G06F 3/044 |
| 2018/0348900 | A1* | 12/2018 | Heinrich | G06F 3/041 |

FOREIGN PATENT DOCUMENTS

KR 10-2016-0114317 A 10/2016

\* cited by examiner

*Primary Examiner* — Jonathan M Blancha
(74) *Attorney, Agent, or Firm* — Sughrue Mion, PLLC

(57) ABSTRACT

The present invention provides a method for manufacturing a flexible display device comprising a touch sensor, capable of controlling process dispersion and inhibiting cracks during the transfer of the touch sensor.

3 Claims, 2 Drawing Sheets

[Figure 1a]
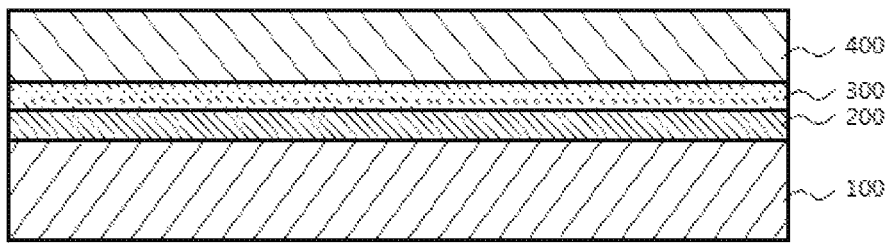
[Figure 1b]
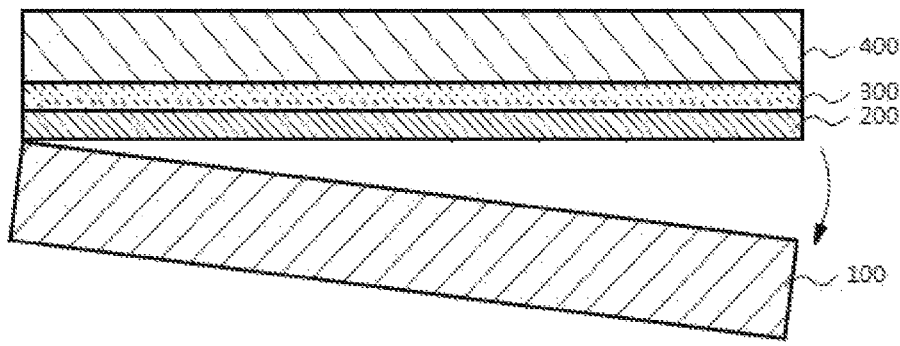
[Figure 1c]
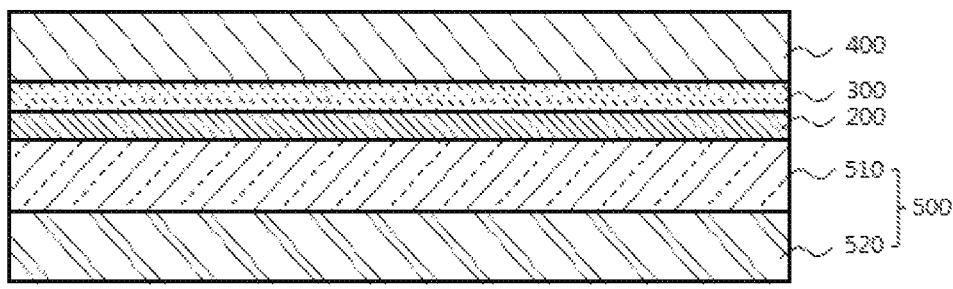

[Figure 1d]
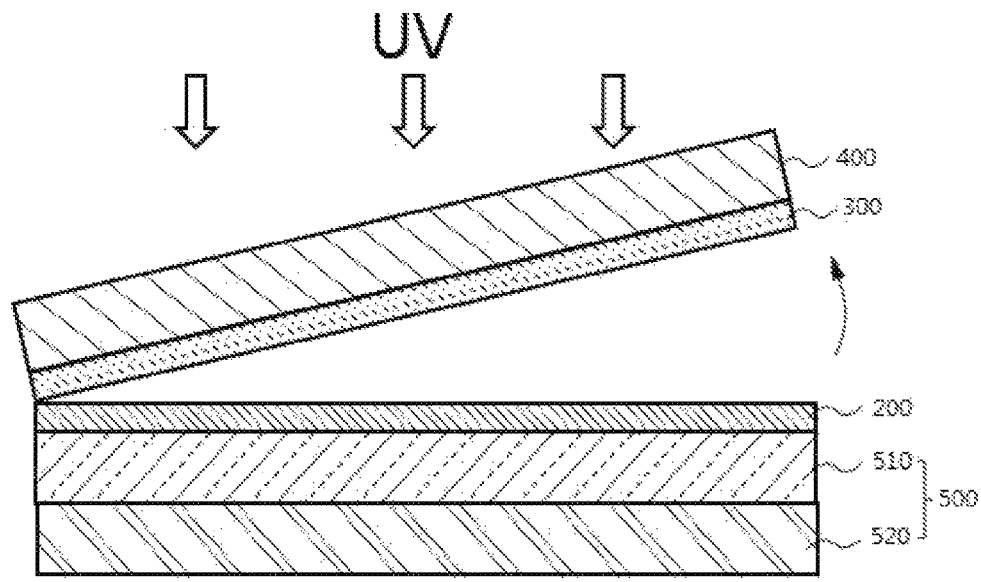
[Figure 2]
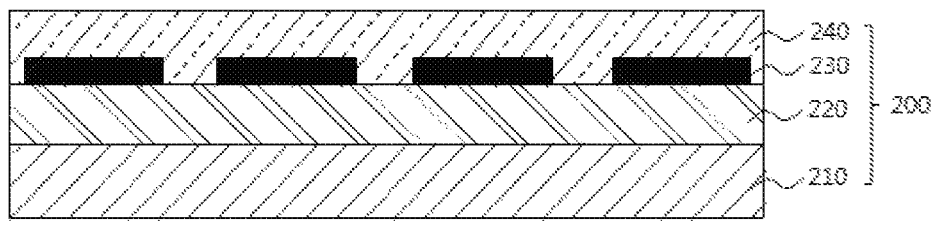
[Figure 3]

METHOD FOR MANUFACTURING FLEXIBLE DISPLAY DEVICE COMPRISING TOUCH SENSOR

CROSS REFERENCE TO RELATED APPLICATIONS

This application claims priority based on Korean Patent Application No. 10,2017/0077345, filed Jun. 19, 2017, the content of which is incorporated herein by reference in its entirety.

TECHNICAL FIELD

The present invention relates to a method for manufacturing a flexible display device comprising a touch sensor. More particularly, the present invention relates to a method for manufacturing a flexible display device comprising a touch sensor capable of controlling process dispersion and inhibiting cracks during the transfer of the touch sensor.

BACKGROUND ART

A touch sensor is a device in which, when a user touches an image displayed on the screen with one's finger, a touch pen, or the like, a touch point is grasped in response to such a touch. The touch sensor is manufactured as a structure mounted on a flat display device such as a liquid crystal display (LCD), an organic light-emitting diode (OLED), and the like.

Recently, a development of a flexible display device which can be rolled or bent like a paper gains attention. Accordingly, a touch sensor attached on the flexible display device also requires flexible property.

For a flexible touch sensor, a thin and flexible substrate should be used, but it is difficult to form the touch sensor on such a substrate, and thus the touch sensor is formed using a carrier substrate. Thereafter, a substrate film is attached on the touch sensor, and then the touch sensor is separated from the carrier substrate and attached on a desired flexible display device, and the substrate film is removed. Thereby, the flexible display device to which the touch sensor is attached can be manufactured.

As the process of the transfer of the touch sensor, a roll-to-roll (R2R) process is mainly used due to the advantage of continuous process[Korean Patent Application Publication No. 10,2016/0114317]. However, the R2R process has the problem that the substrate film is shrunk or relaxed by physical tension, and thus cell to cell shrinkage dispersion is as large as ±100 μm after the transfer due to the irregular shrinkage or relaxation of the substrate film.

Alternatively, a sheet-to-sheet (S2S) process can be used instead of such a R2R process, but the S2S process has the problem that a large amount of cracks are generated in the touch sensor during sheet delamination.

Therefore, there is a need to develop techniques for a method for manufacturing a flexible display device comprising a touch sensor capable of controlling process dispersion and inhibiting cracks during the transfer of the touch sensor.

DISCLOSURE

Technical Problem

It is an object of the present invention to provide a method for manufacturing a flexible display device comprising a touch sensor capable of controlling process dispersion and inhibiting cracks during the transfer of the touch sensor.

Technical Solution

In accordance with one aspect of the present invention, there is provided a method for manufacturing a flexible display device, comprising the steps of:

attaching a substrate film with a UV reactive adhesive to a touch sensor formed on a carrier substrate:

separating the carrier substrate from the touch sensor to which the substrate film is attached;

attaching an optical film to the touch sensor from which the carrier substrate is separated; and irradiating the UV reactive adhesive with UV rays to cure the adhesive and removing the substrate film.

In accordance with another aspect of the present invention, there is provided a touch sensor to which a substrate film is attached with a UV reactive adhesive.

Advantageous Effects

The method of manufacturing a flexible display device according to the present invention can control process dispersion and inhibit cracks during the transfer of the touch sensor.

BRIEF DESCRIPTION OF THE DRAWINGS

FIGS. 1a to 1d schematically show procedures of the method for manufacturing a flexible display device according to an embodiment of the present invention.

FIG. 2 is a cross-sectional view showing the structure of the touch sensor used for a method for manufacturing a flexible display device according to an embodiment of the present invention.

FIG. 3 is a cross-sectional view showing the structure of the touch sensor to which a substrate film is attached with a UV reactive adhesive according to an embodiment of the present invention.

BEST MODE

Hereinafter, the present invention will be described in more detail with reference to the accompanying drawings.

FIGS. 1a to 1d schematically show procedures of the method for manufacturing a flexible display device according to an embodiment of the present invention. With reference to FIGS. 1a to 1d, the method for manufacturing a flexible display device according to an embodiment of the present invention comprises the steps of:

(i) attaching a substrate film 400 with a UV reactive adhesive 300 to a touch sensor 200 formed on a carrier substrate 100;

(ii) separating the carrier substrate 100 from the touch sensor 200 to which the substrate film 400 is attached;

(iii) attaching an optical film 500 to the touch sensor 200) from which the carrier substrate is separated; and (iv) irradiating the UV reactive adhesive 300 with UV rays to cure the adhesive and removing the substrate film 400.

In the method for manufacturing a flexible display device according to an embodiment of the present invention, the steps of (i) to (iv) are carried out by a sheet-to-sheet method. As the steps of (i) to (iv) are carried out by a sheet-to-sheet method, the process dispersion can be controlled. Particularly, the shrinkage dispersion of unit cells of the touch sensor can be controlled within ±50 μm.

In accordance with the method for manufacturing a flexible display device according to an embodiment of the present invention, first, a substrate film 400 is attached with a UV reactive adhesive 300 to a touch sensor 200 formed on a carrier substrate 100, as shown in FIG. 1*a*.

In one embodiment of the present invention, the touch sensor 200 may be a touch sensor in which a separation layer is formed on a carrier substrate to proceed with a process for forming the touch sensor, and the separation layer is used as a wiring coverage layer when separated from the carrier substrate. For example, the touch sensor 200 may be a ultra-thin transfer-type touch sensor.

Specifically, the touch sensor 200 may include a separation layer 210; an electrode pattern layer 230 formed on the separation layer 230; and an insulation layer 240 formed on the electrode pattern layer to cover the electrode pattern layer, as shown in FIG. 2.

The separation layer 210 is made of an organic polymer, and it is applied on a carrier substrate, and separated later from the carrier substrate after the electrode pattern layer is formed thereon.

The separation layer 210 preferably has a peeling strength of 1N/25 mm or less, more preferably 0.1N/25 mm or less. That is, it is preferred that the separation layer 210 is formed from a material that can maintain a physical force applied during separation of the separation layer 210 from the carrier substrate within 1N/25 mm, particularly 0.1N/25 mm.

If the peeling strength of the separation layer 210 exceeds 1N/25 mm, it is difficult to cleanly separate the separation layer from the carrier substrate, so the separation layer 210 may be remained on the carrier substrate. Also, cracks may be generated on at least one of separation layer 210, protective layer 220, electrode pattern layer 230 and insulation layer 240.

In particular, the peeling strength of the separation layer 210 is preferred to have 0.1N/25 mm or less since it allows the control of curl generation after separation from the carrier substrate. The curl may deteriorate the efficiency of adhesion and cutting procedures even though it does not affect the function itself of the film touch sensor. Therefore, it is favorable to minimize curl generation.

Also, the separation layer 210 preferably has a thickness of 10 to 1000 nm, more preferably 50 to 500 nm. If the thickness of the separation layer 210 is less than 10 nm, the separation layer may be unevenly formed to induce the formation of uneven electrode pattern, the peeling strength of the separation layer may be locally raised to cause breakage, or curl control in the touch sensor may be failed after the separation layer is separated from the carrier substrate. If the thickness of the separation layer is more than 1000 nm, the peeling strength of the separation layer may not be lowered anymore, and the flexibility may be deteriorated.

An electrode pattern layer 230 is formed on the separation layer 210. The separation layer 210 acts as a layer of covering the electrode pattern layer 230 or as a layer of protecting the electrode pattern layer 230 from external contact, after the separation layer 210 is separated from the carrier substrate.

On the separation layer 210, at least one protective layer 220 may be further formed. Since only the separation layer 210 may be difficult to achieve complete protection of electrode pattern from external contact or impact, at least one protective layer 220 can be formed on the separation layer 210.

The protective layer 220 may comprise at least one of an organic insulating film and an inorganic insulating film and may be formed by way of coating and curing, or deposition.

The electrode pattern layer 230 may be formed on the separation layer 210 or the protective layer 220. The electrode pattern layer 230 may comprise a sensing electrode that senses touch operation, and a pad electrode formed at one end of the sensing electrode. The sensing electrode may comprise an electrode for sensing touch operation and a wiring pattern connected to the electrode.

The electrode pattern layer 230 may be a transparent conductive layer, and may be formed from at least one selected from the group consisting of a metal, a metal nanowire, a metal oxide, carbon nanotube, graphene, a conductive polymer and a conductive ink.

The electrode pattern layer preferably has the pattern structure used in capacitance mode such as mutual-capacitance mode and self-capacitance mode.

The mutual-capacitance mode may have a grid electrode structure of a horizontal axis and a vertical axis. The point of intersection between electrodes on the horizontal axis and the vertical axis may have a bridge electrode. Alternatively, each electrode pattern layer on the horizontal axis and the vertical axis may be formed and each of them may be electrically apart from each other.

The self-capacitance mode may have an electrode layer structure that recognizes the change of capacitance using one electrode in each position.

On the electrode pattern layer 230, the insulation layer 240 is formed to inhibit the corrosion of the electrode pattern and protect the surface of the electrode pattern. The insulation layer 240 fills a gap in the electrode or the wiring and it is preferably formed to have a certain thickness. That is, the insulation layer is preferably planarized on the opposite surface of the surface in contact with the electrode pattern layer 230 so that the uneven part of the electrode is not emerged.

The insulation layer may be formed from any organic insulating material, and a thermosetting or UV curable organic polymer is preferred.

The touch sensor may have a pad electrode electrically connected with a circuit board. The circuit board may be a flexible printed circuit board (FPCB) and functions to electrically connect the touch sensor with a touch switch circuit.

In one embodiment of the present invention, the carrier substrate 100 may be a glass, but is not limited thereto. That is, other kinds of substrate may be used as the carrier substrate 100 if they are heat-resistant materials that can endure a process temperature for electrode formation and maintain planarization without deformation at a high temperature.

In one embodiment of the present invention, the UV reactive adhesive 300 may be obtained by adding a photopolymerizable compound and a photoinitiator to a pressure-sensitive adhesive which is conventionally used in the art.

The UV reactive adhesive exhibits high adhesion strength before UV irradiation, and lowered adhesion strength after UV irradiation, thereby reducing crack generation during the transfer of touch sensor. In particular, in the step of attaching the substrate film to the touch sensor formed on the carrier substrate and separating the carrier substrate, the UV reactive adhesive imparts higher adhesion strength than the adhesion strength between the touch sensor and the carrier substrate, thereby inhibiting crack generation. In the step of removing the substrate film, the photopolymerizable compound and the photoinitiator perform photopolymerization reaction by UV irradiation and thus the adhesion strength is lowered by the curing shrinkage, so that the substrate film can be easily removed.

In one embodiment of the present invention, the pressure-sensitive adhesive may comprise an acryl-based copolymer and a cross-linking agent.

The acryl-based copolymer may be a copolymer of a (meth)acrylate monomer having an alkyl group of 1 to 12 carbon atoms and a polymerizable monomer having a crosslinkable functional group.

Herein, the (meth)acrylate refers to acrylate and methacrylate.

Specific examples of the (meth)acrylate monomer having an alkyl group of 1 to 12 carbon atoms include n-butyl (meth)acrylate, 2-butyl (meth)acrylate, t-butyl (meth)acrylate, 2-ethylhexyl (meth)acrylate, ethyl (meth)acrylate, methyl (meth)acrylate, n-propyl (meth)acrylate, isopropyl (meth)acrylate, pentyl (meth)acrylate, n-octyl (meth)acrylate, isooctyl (meth)acrylate, nonyl (meth)acrylate, decyl (meth)acrylate, lauryl (meth)acrylate, and the like, and they can be used alone or in combination of two or more.

The polymerizable monomer having a crosslinkable functional group is a component for imparting durability and cutability by reinforcing the cohesive force or adhesive force by a chemical bond. For example, a monomer having a hydroxyl group and a monomer having a carboxyl group may be exemplified, and they can be used alone or in combination of two or more.

Examples of the monomer having a hydroxyl group include 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 2-hydroxyethylene glycol (meth)acrylate, 2-hydroxypropylene glycol (meth)acrylate, hydroxyalkylene glycol (meth)acrylate having an alkylene group of 2 to 4 carbon atoms, 4-hydroxybutyl vinyl ether, 5-hydroxypentyl vinyl ether, 6-hydroxyhexyl vinyl ether, 7-hydroxyheptyl vinyl ether, 8-hydroxyoctyl vinyl ether, 9-hydroxynonyl vinyl ether, 10-hydroxydecyl vinyl ether, and the like.

Examples of the monomer having a carboxyl group include a monovalent acid such as (meth)acrylic acid, crotonic acid and the like; a divalent acid such as maleic acid, itaconic acid, fumaric acid, and an monoalkyl ester thereof; 3-(meth)acryloyl propionic acid; a succinic anhydride ring-opening adduct of 2-hydroxyalkyl (meth)acrylate having an alkyl group of 2 to 3 carbon atoms, a succinic anhydride ring-opening adduct of hydroxyalkylene glycol (meth)acrylate having an alkylene group of 2 to 4 carbon atoms, a compound obtained by a ring-opening addition of succinic anhydride to a caprolactone adduct of 2-hydroxyalkyl (meth)acrylate having an alkyl group of 2 to 3 carbons, and the like.

The acryl-based copolymer may further contain, in addition to the above-mentioned monomers, other polymerizable monomers within a range that does not deteriorate the adhesive strength, for example, in an amount of 10% by weight or less based on the total amount.

The method for preparing the copolymer is not particularly limited, and it can be prepared by methods, which are commonly used in the art, such as bulk polymerization, solution polymerization, emulsion polymerization or suspension polymerization, and solution polymerization is preferable. Further, a solvent, a polymerization initiator, a chain transfer agent for molecular weight control, and the like, which are commonly used in polymerization, can be used.

The acryl-based copolymer commonly has a weight average molecular weight (in terms of polystyrene, Mw) measured by gel permeation chromatography (GPC) of 50,000 to 2,000,000, preferably 400,000 to 2,000,000. If the weight average molecular weight is less than 50,000, cohesive force between the copolymers is insufficient, thereby causing a problem in adhesion durability. If the weight average molecular weight exceeds 2,000,000, a large amount of dilution solvent may be needed in order to secure process property during coating process.

The cross-linking agent is used to enhance adhesion property and durability and to maintain reliability at a high temperature and the form of the adhesive. By way of examples, the cross-linking agent may include, without limitation, isocyanate compounds, epoxy compounds, peroxide compounds, metal chelate compounds, oxazoline compounds, etc. These compounds may be used alone or in combination of two or more. Among these, isocyanate compounds are preferred.

Specifically, diisocyanate compounds such as tolylene diisocyanate, xylene diisocyanate, hexamethylene diisocyanate, 2,4- or 4,4-diphenylmethane diisocyanate; and adducts of polyhydric alcohol compounds such as trimethylolpropane to the diisocyanate compounds may be used.

In addition to the isocyanate cross-linking agent, at least one cross-linking agent selected from the group consisting of melamine derivatives such as hexamethylol melamine, hexamethoxymethyl melamine, hexabutoxymethyl melamine, etc.; polyepoxy compounds such as an epoxy compound obtained from condensation of bisphenol A and epichlorohydrin; polyglycidyl ether of polyoxvalkylene polyol, glycerol diglycidyl ether, glycerol triglycidyl ether, tetraglycidyl xylene diamine may be further used.

The photopolymerizable compound added to the pressure-sensitive adhesive is photopolymerized by UV irradiation thereby reducing the peeling strength of the adhesive. In particular, a polyfunctional acrylate may be used. Examples of the polyfunctional acrylate include hexanediol di(meth)acrylate, (poly)ethylene glycol di(meth)acrylate. (poly)propylene glycol di(meth)acrylate, neopentyl glycol di(meth)acrylate, pentaerythritol di(meth)acrylate, trimethylolpropane tri(meth)acrylate, tetramethylolmethane tetra(meth)acrylate, pentaerythritol tri(meth)acrylate, pentaerythritol tetra(meth)acrylate, dipentaerythritol monohydroxy penta(meth)acrylate, dipentaerythritol hexa(meth)acrylate, epoxy (meth)acrylate, polyester (meth)acrylate, urethane (meth)acrylate, and the like. These polyfunctional acrylates can be used alone or in combination of two or more.

The photoinitiator may include, without limitation, benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenyl acetophenone, 2,2-diethoxy-2-phenyl acetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl) ketone, benzophenone, p-phenyl benzophenone, 4,4'-diethylamino benzophenone, dichloro benzophenone, 2-methyl anthraquinone, 2-ethyl anthraquinone, 2-t-butyl anthraquinone, 2-amino anthraquinone, 2-methyl thioxanthone, 2-ethyl thioxanthone, 2-chloro thioxanthone, 2,4-dimethyl thioxanthone, 2,4-diethyl thioxanthone, benzyl dimethyl ketal, acetophenone dimethyl ketal, p-dimethylamino benzoic acid ester, oligo[2-hydroxy-2-methyl-1-[4-(1-methylvinyl)phenyl]propanone], 2,4,6-trimethylbenzoyl-diphenyl-phosphine oxide, and the like. These photoinitiators can be used alone or in combination of two or more.

In addition to the above-mentioned components, the UV reactive adhesive, if necessary, may further comprise various additives such as an antioxidant, a tackifier, an anti-aging agent, a filler, a colorant and the like.

In one embodiment of the present invention, the substrate film 400 may support and protect the touch sensor 200 during the transfer of the touch sensor.

The substrate film 400, for example, may be made of cyclo-olefin polymer (COP), polycarbonate, polyethylene terephthalate (PET), polymethyl methacrylate, polyimide, polyethylene naphthalate, polyethersulfone and the like.

The thickness of the substrate film 400 may be 75 to 200 µm, particularly 100 to 150 m. If the thickness of the substrate film is less than 75 µm, the tension is extremely high during the transfer of the touch sensor in the S2S process, so that cracks may be generated in the touch sensor. If the thickness exceeds 200 µm, the elasticity modulus of the substrate film may be too high to make it difficult to control the peeling process.

After attaching the substrate film 400 with the UV reactive adhesive 300 to the touch sensor 200 formed on the carrier substrate 100 as described above, the carrier substrate 100 is separated from the touch sensor 200 to which the substrate film 400 is attached, as shown in FIG. 1b.

The method for separating the touch sensor 200 to which the substrate film 400 is attached from the carrier substrate 100 may be carried out by way of lift-off or peel-off, but is not limited thereto.

Subsequently, as shown in FIG. 1c, the optical film 500 is attached to the touch sensor 200 from which the carrier substrate is separated.

The optical film 500 may be a polarizing plate 510 and/or a display panel 520.

The polarizing plate 510 includes an elongation-type or coating-type polarizer, and may include a protective film laminated on at least one side of the polarizer as needed.

The display panel 520 may be, for example, liquid crystal display (LCD) panel, plasma display panel (PDP), organic light emitting diode (OLED) panel, electrophoretic display (EPD) panel, and the like.

The optical film 500 may be attached with an adhesive known in the art, such as a UV curable adhesive, an electron ray curable adhesive, a water-based adhesive, a thermoplastic adhesive, a hot-melt adhesive, a rubber-based adhesive, a thermosetting adhesive, an inorganic adhesive, a natural adhesive and the like. Particularly, it is preferred to use a UV curable adhesive.

Examples of the UV curable adhesive may include an adhesive using photoradical polymerization, such as a (meth)acrylate-based adhesive, a thiol-ene-based adhesive, an unsaturated polyester-based adhesive and the like; and an adhesive using photocationic polymerization, such as an epoxy-based adhesive, an oxetane-based adhesive, an epoxy/oxetane-based adhesive, a vinylether-based adhesive and the like.

Thereafter, as shown in FIG. 1d, the UV reactive adhesive 300 is irradiated with UV rays to cure the adhesive, and then the substrate film 400 is removed.

The adhesion strength of the UV reactive adhesive 300 is lowered by UV irradiation, so that the substrate film 400 can be easily removed.

FIG. 3 is a cross-sectional view showing the structure of the touch sensor to which the substrate film is attached with the UV reactive adhesive according to an embodiment of the present invention. With reference to FIG. 3, the touch sensor to which the substrate film is attached with the UV reactive adhesive according to an embodiment of the present invention includes the touch sensor 200, the UV reactive adhesive 300 formed on the touch sensor 200, and the substrate film 400 formed on the UV reactive adhesive 300.

The touch sensor to which the substrate film is attached with the UV reactive adhesive can control shrinkage dispersion of unit cells of the touch sensor within ±50 µm and inhibit crack generation, when the touch sensor is transferred on the optical film such as a polarizing plate and a display panel. Therefore, it can be effectively used for manufacturing a flexible display device including an ultra-thin touch sensor.

The touch sensor 200, the UV reactive adhesive 300 and the substrate film 400 are described in the above method for manufacturing a flexible display device, and thus a detailed description thereof will be omitted.

Hereinafter, the present invention will be described in more detail with reference to examples, comparative examples and experimental examples. It should be apparent to those skills in the art that these examples, comparative examples and experimental examples are for illustrative purpose only, and the scope of the present invention is not limited thereto.

Examples 1 to 2: Manufacture of Touch Sensor to which Substrate Film is Attached Touch sensors to which substrate films are attached were manufactured by a sheet-to-sheet method, while changing the thicknesses of PET films as the substrate films, the types and initial peeling strengths of adhesives for attaching the substrate films, as shown in Table 1 below.

Comparative Examples 1 to 2: Manufacture of Touch Sensor to which Substrate Film is Attached Touch sensors to which substrate films are attached were manufactured by a roll-to-roll method in the case of Comparative Example 1 and by a sheet-to-sheet method in the case of Comparative Example 2, while changing the thicknesses of PET films as the substrate films, the types and initial peeling strengths of adhesives for attaching the substrate films, as shown in Table 1 below.

Experimental Example 1

The substrate film-attached touch sensors manufactured in Examples and Comparative Examples were measured for the shrinkage of the long sides of cells and the number of cracks, and the results thereof are shown in Table 1 below.

TABLE 1

| | | R2R method | S2S method | | |
|---|---|---|---|---|---|
| Category | Unit | Comparative Example 1 | Comparative Example 2 | Example 1 | Example 2 |
| Thickness of substrate film | µm | 125 | 125 | 75 | 125 |

TABLE 1-continued

| | | R2R method | S2S method | | |
|---|---|---|---|---|---|
| Category | Unit | Comparative Example 1 | Comparative Example 2 | Example 1 | Example 2 |
| Type of adhesive | — | Pressure-sensitive adhesive | Pressure-sensitive adhesive | UV reactive adhesive | UV reactive adhesive |
| Peeling strength | N/25 mm | 0.1 | 0.1 | 3.5 | 1.8 |
| Shrinkage of long side of cell | % | 0.15 ± 0.06 | −0.08 ± 0.04 | 0.05 ± 0.03 | 0.02 ± 0.02 |
| | μm | 230 ± 91 | −97.8 ± 49 | 77 ± 36 | 30.4 ± 29 |
| Crack | Number of cracks | 0 | 27 | 8 | 2 |

As can be seen from Table 1, in the case of the touch sensors of Examples 1 and 2 according to the present invention, the shrinkage dispersion of unit cells was controlled within ±50 μm and the cracks were inhibited. On the other hand, in the case of the touch sensors of Comparative Examples 1 and 2, the shrinkage dispersion of unit cells failed to be controlled within ±50 μm or the cracks were generated.

Although particular embodiments of the present invention have been shown and described in detail, it will be obvious to those skilled in the art that these specific techniques are merely preferred embodiments and the scope of the invention is not limited thereto. It will be understood by those skilled in the art that various changes and modifications may be made to the invention without departing from the spirit and scope of the invention.

The substantial scope of the present invention, therefore, is to be defined by the appended claims and equivalents thereof.

DESCRIPTION OF REFERENCE NUMERALS

| | |
|---|---|
| 100: Carrier substrate | 200: Touch sensor |
| 210: Separation layer | 220: Protective layer |
| 230: Electrode pattern layer | 240: Insulation layer |
| 300: UV reactive adhesive | 400: Substrate film |
| 500: Optical film | 510: Polarizing plate |
| 520: Display panel | |

The invention claimed is:

1. A method for manufacturing a flexible display device, comprising the steps of:
    (i) attaching a substrate film with a UV reactive adhesive to a touch sensor formed on a carrier substrate;
    (ii) separating the carrier substrate from the touch sensor to which the substrate film is attached;
    (iii) attaching an optical film to the touch sensor from which the carrier substrate is separated; and
    (iv) irradiating the UV reactive adhesive with UV rays to cure the adhesive and removing the substrate film with the UV reactive adhesive,
    wherein the UV reactive adhesive comprises an acryl-based copolymer, a cross-linking agent, a polyfunctional acrylate, and a photoinitiator,
    wherein the cross-linking agent is one or more selected from the group consisting of an isocyanate cross-linking agent, an epoxy cross-linking agent, a peroxide cross-linking agent, a metal chelate cross-linking agent, and an oxazoline cross-linking agent,
    wherein the acryl-based copolymer is crosslinked with the cross-linking agent without UV radiation in step (i), thereby imparting adhesion strength,
    wherein the polyfunctional acrylate is photopolymerized upon UV radiation in step (iv), thereby reducing peeling strength of the UV reactive adhesive,
    wherein all the steps of (i) to (iv) are carried out by a sheet-to-sheet method, and
    wherein a thickness of the substrate film is 75 to 200 μm.

2. The method according to claim 1, wherein the carrier substrate is a glass substrate.

3. The method according to claim 1, wherein the optical film is a polarizing plate or a display panel.

\* \* \* \* \*